Aug. 11, 1959 W. Z. PENLAND, JR 2,899,173
LINE SUPPORT
Filed Jan. 12, 1956 2 Sheets-Sheet 1
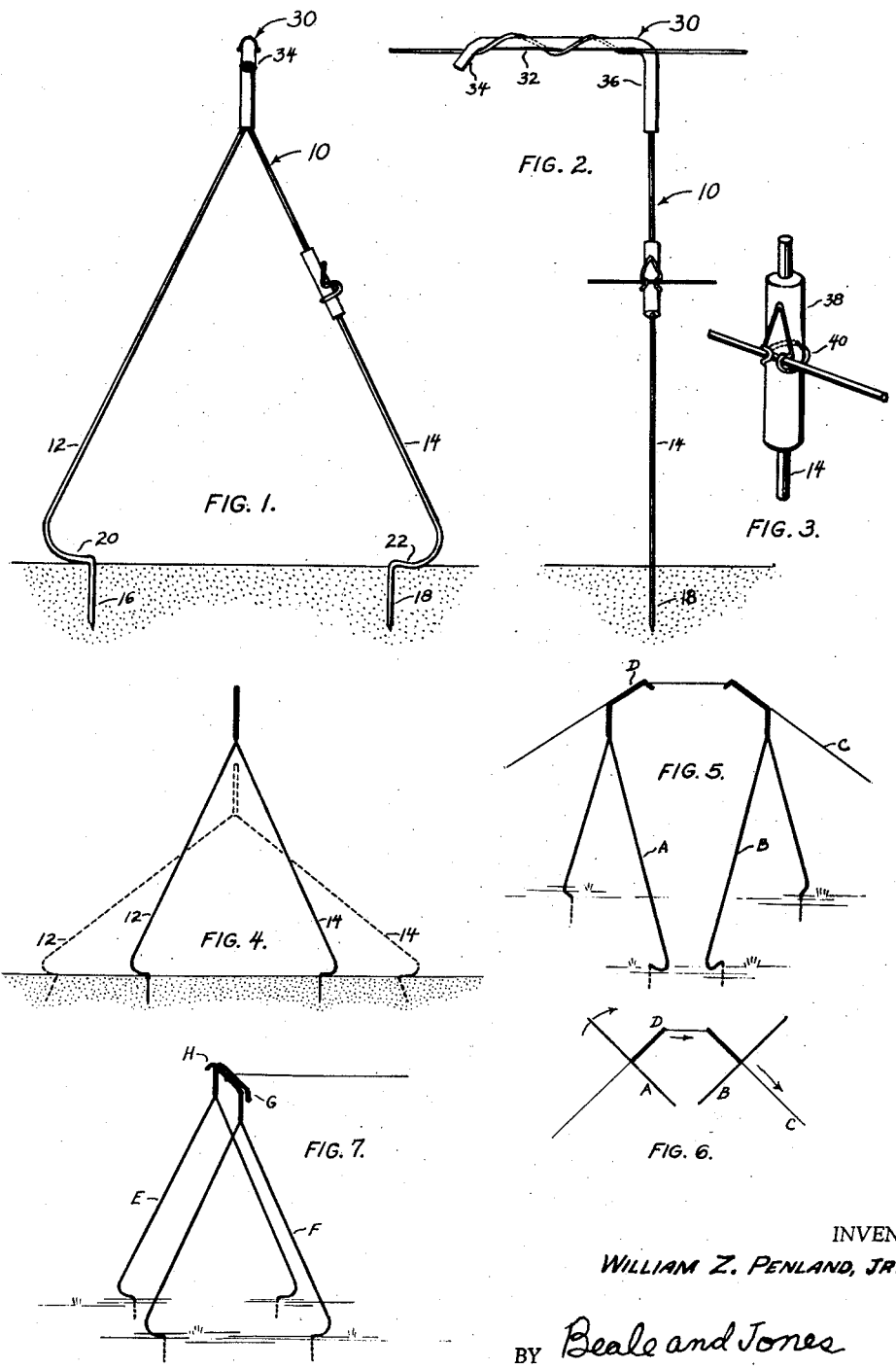
INVENTOR
WILLIAM Z. PENLAND, JR.
BY Beale and Jones
ATTORNEYS Aug. 11, 1959 W. Z. PENLAND, JR 2,899,173
LINE SUPPORT Filed Jan. 12, 1956 2 Sheets-Sheet 2

SECT. 11-11

INVENTOR
WILLIAM Z. PENLAND, JR.

BY Beale and Jones
ATTORNEYS

United States Patent Office 2,899,173
Patented Aug. 11, 1959

2,899,173

LINE SUPPORT

William Zadock Penland, Jr., Louisville, Ky.

Application January 12, 1956, Serial No. 558,739

5 Claims. (Cl. 256—10)

This invention relates to supports for lines and the like and offers a support especially adapted to serve as a fencepost, carrying a rope, cable or wire for the purpose of enclosing an area of land. More specifically, when it is insulated and used in combination with an electrically conductive wire and a charging system, this invention offers an ideal support for electric fencing.

An object of this invention is to provide a sturdy support capable of being used in one location and then easily moved and stored or put to use in another place. For this reason, it is extremely adaptable to modern systems of controlled cattle grazing or rotation grazing, or grazing on strips between or adjacent strips of growing crops. With the use of my supports, it is a simple matter to enclose one grazing area for two or three days and then to remove the enclosing system to another pasture or grazing area. While it is thus sturdy and readily movable, this support is of extremely simple construction and is inexpensive to manufacture.

A further object of this invention is to provide a line support which requires no tools for its installation or removal. It can be installed for use or removed for storage or reinstallation by one man with the pressure of his foot or the pull of his hand. Thus this post obviates the need for awkward and cumbersome fencepost digging or driving implements and also obviates the work connected with the use of such implements. Further, this facile mobility of my support gives it a long life since the post can be removed personally and stored at times when most posts are subjected to weathering and corrosion.

Another object of this invention is to provide a line support which may be used cooperatively with one or more similar supports to form a single supporting structure of great strength adapted to serve as a corner post or as a sideline post in cases where there is unusual stress on the line.

Another object of this invention is to provide a line support which is capable of vertical adjustments by simple manipulation of its members without the use of tools.

Still another object of this invention is to provide a line support which, aside from the stability given it by its engagement with the ground, gains additional stability from its engagement with the line which it supports.

A further object of this invention is to provide a support which, when not in use, can be stored with similar supports in a compact pile in a small space.

Generally, the support comprises a compression member and a line-contacting member. The compression member includes two legs preferably of equal length which are attached to each other at their upper ends and are spaced apart at their lower ends. The lower ends are preferably provided with ground-impaling tips and with shoulders formed immediately above the tips for use in inserting the tips into the ground. The line-contacting member comprises, in the preferred form, an arm which is attached to the upper end of the compression member and extends perpendicular to the plane thereof. For use with an electric fence, the arm may be insulated by means of a sleeve of non-conductive material.

The support can be formed from two pieces of rod or tubing, one piece forming a leg and the second piece forming the other leg and the line-contacting member. Obviously, a toolmaker's jig can be employed to impart the proper bends to the rod, and the pieces can be attached by welding.

As to the material from which my support may be made, I prefer steel or iron rod such for example as ⅜ inch stock which can be easily formed into the desired shape and which can be easily welded. Also this stock is sufficiently flexible to allow vertical adjustment by increasing or decreasing the span of the legs. But it should be understood that other stock is well suited for the construction of my supports; for example, rods formed of certain aluminum alloys or even reinforced plastic, and it should be understood that tubular stock or stock shaped like small angle irons or beams of iron, aluminum or plastic may be employed. The parts may also be attached together by other means than by welding; rivets, screws, or suitable clamps may be used.

The following is a description of the preferred embodiment of my line support along with suggested modifications, reference being made to the accompanying drawings in which:

Fig. 1 shows a front elevational view of the support in operation;

Fig. 2 shows a side elevational view of the support in operation;

Fig. 3 shows a preferred form of insulator adapted to be applied to a leg of the support;

Fig. 4 shows a front view of the support in operation with a phantom view showing the legs in an extended position;

Fig. 5 shows a perspective side view, slightly from above, of two supports as used together in my preferred corner supporting station;

Fig. 6 shows a plan view of my preferred corner support station;

Fig. 7 is a perspective view slightly from above of two supports used together to form a support station of extra strength;

Figure 9:
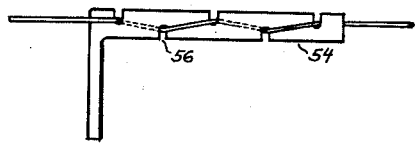
Figure 10:
Figure 12:
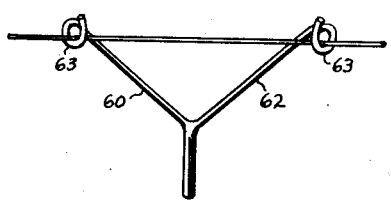
Figure 11:
Figure 13:
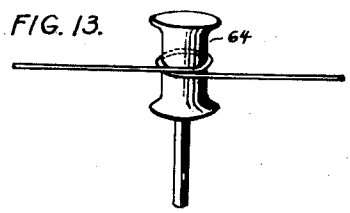
Figure 14:
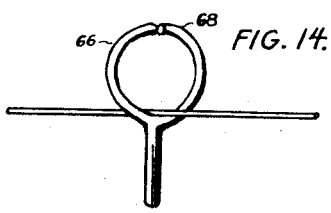
Figure 15:
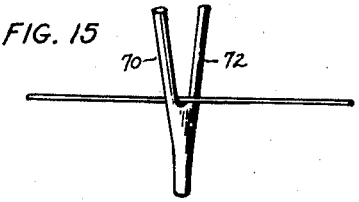
Figure 16:
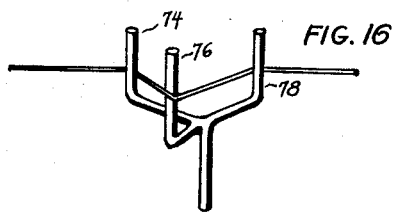
Figures 17, 18:
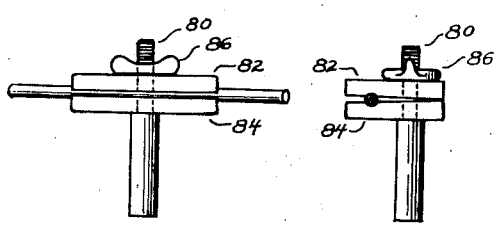

Figs. 8 through 18 show detailed views of a number of line-contacting members adapted to be used with my support as modifications of my preferred member. Specifically, Figs. 8 through 10, 12, 14 and 17 are front views of such modifications. Fig. 11 is a sectional view taken on the lines 11—11 of Fig. 10. Figs. 13, 15, and 16 are perspective front views of such members as seen slightly from above. Fig. 18 is a side view of the modification shown in Fig. 17.

In the preferred embodiment of my invention shown in Fig. 1 the compression member is generally designated 10 and comprises the two legs 12 and 14. Both of these legs terminate in ground-impaling members 16 and 18 which are inserted into the ground when the line support is in use. To facilitate this insertion, the legs are provided with inwardly directed shoulders 20 and 22 of horizontal disposition to which the pressure of the foot may be applied. Another purpose of these shoulders 20 and 22 is to provide stops, preventing insertion of the leg members into the ground beyond said stops, thus assuring equal penetration of the ground by each leg and the increased stability arising from the added bearing surface on the ground. As can be seen in Fig. 1, the legs converge at their upper ends where in the preferred form they are joined by welding.

The line-contacting member is generally designated 30 and comprises an arm 32 which extends perpendicular to the plane of the compression member 10 and is attached to the top thereof. At its unattached end, the arm 32 terminates in a downturned tip 34 which prevents the unraveling of the line when wrapped about it. In use with electric fencing, the arm may be effectively insulated by means of a sleeve 36 of nonconductive material such as polyethylene or equivalent plastic. Such a sleeve 36 can be slipped over the arm to cover all portions thereof which might otherwise contact the line. If the sleeve 36 is open at both ends, or in other words is an open tube, the downturned tip 34 serves to hold the exposed end of the arm away from possible contact with the line, precluding possibility of grounding the line. The downturned tip also provides a spot for rain water to drip off without danger of grounding the charged line.

A valuable feature of my support is well shown in Fig. 2; namely, the ability of the support to gain stability from the line which it supports. As can be seen, the line is wrapped about the arm 32 in such a way as to preclude slippage of the arm lengthwise along the line. Thus, any force tending to tip over one support will be transmitted along the line and resisted and shared by other supports. This feature can be highlighted by showing that with the preferred line-contacting member in proper engagement with the line, the compression member of my support need not penetrate the ground at all. It may serve as an effective prop for the line without penetration, because the line will maintain the support in upright position.

As shown in Figs. 1 and 2 and in detail in Fig. 3, an additional line can be carried by one or both legs of my line support. In the case of a charged line this can be accomplished by applying an insulating sleeve 38 to the leg 14 and attaching the secondary line to the sleeve as by spring clip means 40.

Fig. 4 shows how I may adjust the height of my line support. As can be understood from comparison of the full and phantom views, the height of my support varies inversely as the span of the legs. Therefore, to decrease the height of my support, I merely spread the legs farther apart. Conversely, to elevate my support, I draw the legs together. To provide for this adjustment, I either construct the legs 12 and 14 of flexible stock, or join them pivotally at the point of convergence.

Figs. 5 and 6 show views of the corner arrangement which I prefer in making my enclosures. In this arrangement the planes of two supports A and B are at right angles and the line stretches between the tips of the two arms.

This arrangement is preferred because a stress along one sideline C is partly absorbed by the support B and partly transmitted to the tip of the arm D of support A resulting in a clockwise torque on support A. Support A is well able to withstand this turning moment because it tends to urge the ground impaling tips to move laterally in the ground rather than to uproot them, and the ground resists such lateral movement.

Fig. 7 shows a view of a sideline support station wherein two of my supports E and F are disposed with their planes in parallel relation and with their arms G and H also parallel and adjacent each other.

Obviously there are many various arrangements for effecting the cooperation of a plurality of my supports to form a single supporting station. I have here merely suggested some of the arrangements which I prefer as illustrative of my invention. Other arrangements can be easily worked out to meet the forces expected to be applied to the line, the nature of the terrain, the size and type of livestock to be controlled, and the like. I also contemplate that supplemental anchors and guys can be sometimes used with my support to gain increased stability where the line is to be subjected to unusual demands.

Figs. 8 through 18 show detailed views of modifying line-contacting members adapted to take the place of the arm 32 of the preferred embodiment.

Figure 8:
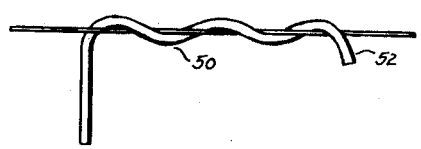

Fig. 8 shows the arm 50 of corkscrew configuration. While this type requires a special step in manufacture not required by the straight arm 32, it has the advantage of requiring less deformation of the line it engages. The arm 50 terminates in the downturned tip 52.

Fig. 9 shows a line-contacting member comprising a plate 54 with notches 56 along the top and bottom edges thereof. These notches occur alternately on the top and bottom edges so that the line may be wrapped about the plate as shown.

The modification of the line-contacting member shown in Figs. 10 and 11 is a horizontal tube with spiral cross section as shown in Fig. 11 so that the line may be inserted therein and cradled thereby.

Fig. 12 shows a line-contacting member comprising a pair of inclined upwardly extending arms 60 and 62, each having a downward deflection, as at 63, forming a crutch for supporting the line.

Fig. 13 shows a line contacting member comprising a spool 64 with a vertical axis attached directly to the top of the compression member. In use the line is merely wound about the spool.

Fig. 14 shows a modification in which the line-contacting member comprises two arms 66 and 68 forming a circle, open at the top to receive the line within its embrace and support it by gravity alone.

A structure comparable to Fig. 14 is shown in Fig. 15 except that the two arms 70 and 72 are straight, and extend upwardly to form a fork to cradle the line.

Fig. 16 shows a line-contacting member comprising a spider with three arms 74, 76, and 78. These arms extend radially outward from the top of the compression member and turn perpendicularly upward. When this type of contact member is used, the lines may be wound in and out about the spider arms as shown.

Shown in Figs. 17 and 18 is a clamp-type line-contacting member. It comprises a pair of complementary plates adapted to be received onto a reduced threaded portion of the compression member 80. In use, the line is received between the plates 82 and 84 and the plates are then drawn together by means of a thumb nut 86.

It should be understood that any and all of the suggested line-contacting members are usable with an electric fencing system. It is only necessary to cover the member with a non-conductive material or fabricate the member itself out of such material.

Thus, I have invented a line support of simple yet sturdy construction which is specially adapted to serve as an electric fence post. Its easy installation and removal make it ideally suited for use under modern systems of strip cropping or controlled cattle grazing which include rotation grazing. In addition, my support is vertically adjustable and is capable of being used with other similar supports to form a single supporting station of great strength.

Having thus explained the nature of the invention and described an operative manner of constructing and using the same, although without attempting to set forth all of the forms in which it may be made or all of the forms of its use, what is claimed is:

1. An electric fence post comprising in combination a pair of coplanar legs welded together at their upper ends, said legs each comprising elongated rod members and formed so as to diverge from each other below and adjacent said weldment, with a portion at the lower ends thereof bent inwardly toward the other leg and downwardly, the tip of the lower end of each leg being sharpened for facilitating impalement of the ground, said legs being sufficiently resilient to be flexed at will yet rigid enough so that the lower ends can be inserted into the ground without collapsing under a downward force, one of said legs having an upward extension above said weldment, said extension being integral with said leg, said extension having a first bend a short distance above said weldment so that the portion beyond said first bend from said weldment extends substantially perpendicular to the plane of said legs said perpendicular portion terminating in a downwardly inclined tip, the portion of said leg extension above said weldment being covered by an insulating sleeve, said fence post in its entirety being of such light weight as to be in part at least supported by the electric line with which it is adapted for use.

2. An electric fence post as described in claim 1 wherein said downwardly bent portions of the lower ends of said legs are disposed substantially vertical.

3. A fence comprising a line member and a plurality of fence posts, each fence post comprising a pair of coplanar legs attached together at their upper ends, said legs each comprising an elongated rod member and formed so as to diverge from each other below said attachment, said legs being sufficiently resilient to be flexed at will yet rigid enough so that the lower ends can be inserted into the ground without collapsing under a downward force, an extension secured to said attachment and comprising an arm perpendicular to the plane of said legs, said fence posts being spaced from each other and generally aligned in a row along said line, the planes of the legs of each post being generally perpendicular to the line and the lower ends of the legs of said posts engaging the ground, said line being secured to each of said posts by being wrapped about each of said arms, each of said fence posts in its entirety being of such light weight as to be in part at least supported by the line.

4. A fence as described in claim 3 wherein said arm is insulated and said line is adapted to carry an electric charge.

5. A fence as described in claim 3 wherein each of said arms has a distal end terminating in a downwardly inclined tip precluding the unraveling of the line.

References Cited in the file of this patent

UNITED STATES PATENTS

| | | |
|---|---|---|
| 378,971 | Neal | Mar. 6, 1888 |
| 946,147 | Mohrhoff | Jan. 11, 1910 |
| 1,058,090 | Nelson | Apr. 8, 1913 |
| 1,474,835 | Hogan | Nov. 20, 1923 |
| 2,107,594 | Bicknese | Feb. 8, 1938 |
| 2,264,493 | Werning | Dec. 2, 1941 |
| 2,650,454 | Wurdinger | Sept. 1, 1953 |
| 2,744,154 | Ludwig | May 1, 1956 |

FOREIGN PATENTS

| | | |
|---|---|---|
| 480,353 | Canada | Jan. 15, 1952 |